United States Patent
Li

(10) Patent No.: US 11,233,819 B2
(45) Date of Patent: Jan. 25, 2022

(54) METHOD AND APPARATUS FOR ANALYZING CYBERATTACK

(71) Applicant: Beijing Baidu Netcom Science and Technology Co., Ltd., Beijing (CN)

(72) Inventor: Jinjin Li, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 209 days.

(21) Appl. No.: 16/562,161

(22) Filed: Sep. 5, 2019

(65) Prior Publication Data

US 2019/0394233 A1 Dec. 26, 2019

(30) Foreign Application Priority Data

Oct. 12, 2018 (CN) .......................... 201811188369.4

(51) Int. Cl.
*H04L 29/06* (2006.01)

(52) U.S. Cl.
CPC ...... *H04L 63/1466* (2013.01); *H04L 63/0876* (2013.01); *H04L 63/1425* (2013.01)

(58) Field of Classification Search
CPC ............. H04L 63/1466; H04L 63/0876; H04L 63/1425
See application file for complete search history.

(56) References Cited

U.S. PATENT DOCUMENTS

| | | | |
|---|---|---|---|
| 7,613,815 B1 * | 11/2009 | Prakash | ................. H04L 67/28 707/999.1 |
| 8,930,330 B1 | 1/2015 | Arguelles et al. | |
| 10,171,495 B1 * | 1/2019 | Bowen | .................... G06N 7/005 |
| 2003/0101358 A1 * | 5/2003 | Porras | ..................... G06F 21/55 726/4 |
| 2004/0088408 A1 * | 5/2004 | Tsyganskiy | ......... H04L 63/1408 709/225 |
| 2009/0055443 A1 * | 2/2009 | Miyamoto | ............ G06F 16/958 |
| 2010/0050263 A1 * | 2/2010 | Weisman | ............ H04L 63/1433 726/25 |
| 2016/0127406 A1 * | 5/2016 | Smith | ................. H04L 63/1458 726/23 |
| 2016/0129406 A1 * | 5/2016 | Chong | .................. B01F 3/1242 366/108 |
| 2019/0215330 A1 * | 7/2019 | Neuvirth | ............. H04L 63/1433 |

FOREIGN PATENT DOCUMENTS

| | | |
|---|---|---|
| CN | 105933268 A | 9/2016 |
| CN | 106878240 A | 6/2017 |
| CN | 107040606 A | 8/2017 |
| CN | 107302586 A | 10/2017 |
| CN | 107392028 A | 11/2017 |

\* cited by examiner

*Primary Examiner* — Vance M Little

(74) *Attorney, Agent, or Firm* — Kilpatrick Townsend & Stockton LLP

(57) ABSTRACT

Embodiments of the present disclosure provide a method and apparatus for analyzing a cyber attack. A method may include: acquiring a web blog of a server; detecting whether a hypertext transfer protocol request in the web log is offensive, to obtain a detection result of the hypertext transfer protocol request, and storing the hypertext transfer protocol request, the detection result of the hypertext transfer protocol request, and extracted data portion correspondingly.

13 Claims, 4 Drawing Sheets

Acquiring a web log of a server — 201

Detecting whether a http request is offensive, to obtain a detection result, and storing the http request, the detection result of the http request, and extracted data portion correspondingly — 202

METHOD AND APPARATUS FOR ANALYZING CYBERATTACK

CROSS-REFERENCE TO RELATED APPLICATIONS

This application claims priority to Chinese Patent Application No. 201811188369.4, filed on Oct. 12, 2018, titled "Method and apparatus for analyzing cyber attack," which is hereby incorporated by reference in its entirety.

TECHNICAL FIELD

The present disclosure relates to the computer field, specifically to the field of cyber security, and more specifically to a method and apparatus for analyzing a cyber attack.

BACKGROUND

It is necessary to carry out security analysis on an online web log, to timely sense web attack situation of an online service. At present, a result obtained from the security analysis is merely a statistical result, such as how many times of attacks happened, and fails to reflect specific web attack situation of the online service. In addition, an operation and maintenance engineer cannot further analyze the web attack situation of the online service in detail based on the analysis result.

SUMMARY

Embodiments of the present disclosure provide a method and apparatus for analyzing a cyber attack.

In a first aspect, an embodiment of the present disclosure provides a method for analyzing a cyber attack, including: acquiring a web blog of a server, the web blog of the server including: a hypertext transfer protocol request received by the server, and a data portion extracted from a response of hypertext transfer protocol corresponding to the hypertext transfer protocol request; and detecting whether the hypertext transfer protocol request in the web log is offensive, to obtain a detection result of the hypertext transfer protocol request, and storing the hypertext transfer protocol request, the detection result of the hypertext transfer protocol request, and the extracted data portion correspondingly.

In a second aspect, an embodiment of the present disclosure provides an apparatus for analyzing a cyber attack, including: an acquiring unit configured to acquire a web blog of a server, the web blog of the server including: a hypertext transfer protocol request received by the server, and a data portion extracted from a response of hypertext transfer protocol corresponding to the hypertext transfer protocol request; and an analyzing unit configured to detect whether the hypertext transfer protocol request in the web log is offensive, to obtain a detection result of the hypertext transfer protocol request, and store the hypertext transfer protocol request, the detection result of the hypertext transfer protocol request, and the extracted data portion correspondingly.

The method and apparatus for analyzing a cyber attack provided by the embodiments of the present disclosure acquire a web blog of a server; detect whether a hypertext transfer protocol request in the web log is offensive, to obtain a detection result of the hypertext transfer protocol request, and store the hypertext transfer protocol request, the detection result of the hypertext transfer protocol request, and extracted data portion correspondingly, thereby achieving storing data required for detailed analysis of web attack situation of an online service in the web log, and reflecting specific web attack situation of the online service, such that an operation and maintenance engineer may further analyze the web attack situation of the online service in detail. Further, the operation and maintenance engineer may comprehensively analyze the web attack situation of the online service in detail by accurately detecting web attacks, white list filtering, and replay attack.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
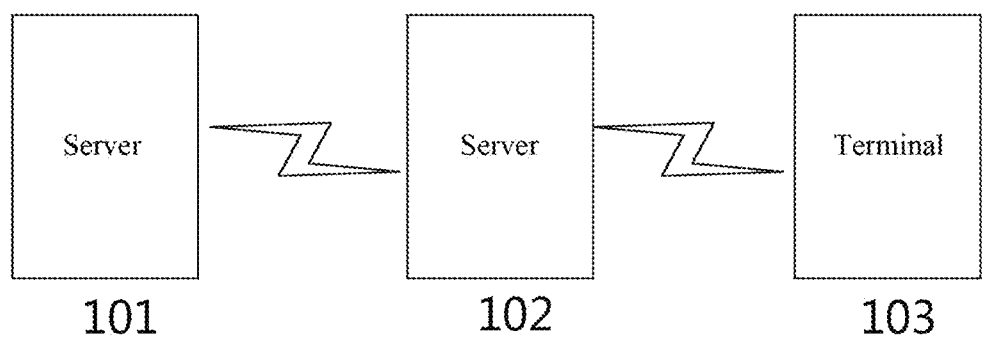
FIG. 1 shows an exemplary system architecture adapted to implement embodiments of the present disclosure.

Referring to FIG. 1, an exemplary system architecture adapted to implement embodiments of the present disclosure is shown.

As shown in FIG. 1, the system architecture includes a server 101, a server 102, and a terminal 103.

The server 101 may receive a hypertext transfer protocol (http for short) request from an electronic device requesting the server 101 to provide a service, and send a http response corresponding to the http request to the electronic device. A web log stored on the server 101 stores the received http request and a data portion extracted from the http response corresponding the http request.

The server 102 may acquire contents in the web log on the server 101, analyze web attack situation of the server 101, and send an analysis result to the terminal 103. The analysis result is presented to a user of the terminal 103, e.g., an operation and maintenance engineer, on the terminal 103, such that the user of the terminal 103 may further analyze the web attack situation of the server 101 in detail based on the analysis result.

Figure 2:
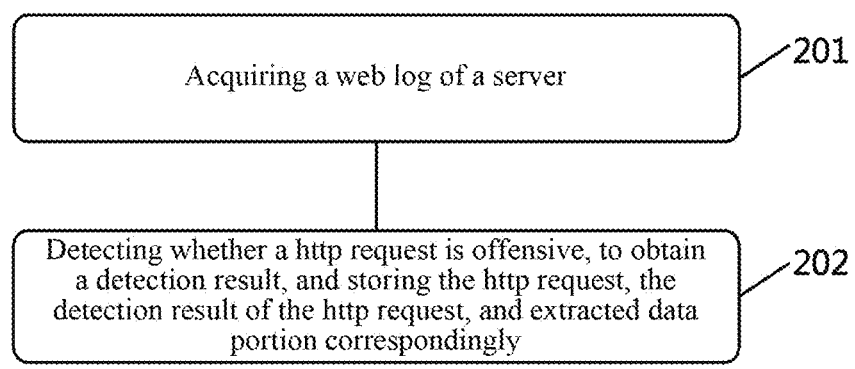
FIG. 2 shows a flowchart of a method for analyzing a cyberattack according to an embodiment of the present disclosure.

Referring to FIG. 2, a process of a method for analyzing a cyberattack according to an embodiment of the present disclosure is shown. The method for analyzing a cyberattack according to the embodiment the present disclosure may be executed by a server (e.g., the server 102 in FIG. 1). The method includes the following steps.

Step 201: acquiring a web log of a server.

In the present embodiment, web logs of a plurality of servers may be acquired. Each record in the web log of a server includes a http request received by the server, and a data portion extracted from a http response corresponding to the http request, i.e., a body portion in the http response.

Step 202: detecting whether a http request is offensive, to obtain a detection result, and storing the http request, the detection result of the http request, and extracted data portion correspondingly.

In the present embodiment, whether each request for hypertext transfer protocol in the web log is offensive is detected respectively, to obtain the detection result respectively. For each request for hypertext transfer protocol, the request for hypertext transfer protocol, the detection result of the request for hypertext transfer protocol, and the extracted data portion may be stored correspondingly.

In the present embodiment, the http request, the detection result of the http request, and the data portion extracted from the http response corresponding to the http request are stored correspondingly. Therefore, for a http request being offensive in the detection result, whether an attack of the offensive http request is successful, and what kind of data is acquired when the attack is successful may be further analyzed in detail based on the correspondingly stored http request, detection result of the http request, and extracted data portion.

In some alternative implementations of the present embodiment, the detecting whether the request for hypertext transfer protocol in the web log is offensive includes: calculating, in response to the http request matching at least one attack rule template, a score corresponding to the http request, the score corresponding to the http request being a sum of a score corresponding to each attack rule template matching the http request, the score corresponding to each attack rule template indicating a hazard level of an attack approach corresponding to the attack rule template on a system; and obtaining the detection result based on the score obtained from calculation.

For each http request in the web log, whether the http request is offensive may be detected by a plurality of detection approaches, and when detecting the http request by each detection approach, an attack rule template belonging to the corresponding detection approach may be used. The detection approaches may include a detection approach of matching regular feature, a detection approach based on a dynamic detection rule of a SQL syntax, and the like. An attack detection template of the detection approach of matching regular feature may include a character string describing an attack feature when attacking using a static SQL statement, and there may be a plurality of character strings describing the attack feature when attacking using the static SQL statement. The attack detection template of the detection approach based on the dynamic detection rule of the SQL syntax may include a character string describing an attack feature when attacking using a dynamic SQL statement, and there may be a plurality of character strings describing the attack feature when attacking using the dynamic SQL statement.

When the number of character strings describing the attack feature in an attack detection template included in the http request is greater than a number threshold, then the http request matches the attack detection template. Each attack detection template of each detection approach may correspond to a score. The score may denote a hazard level of an attack approach corresponding to the attack rule template on the system.

When detecting whether a http request is offensive, a score corresponding to the http request may be calculated. The score corresponding to the http request is a sum of a score corresponding to each attack rule template matching the http request. The score corresponding to the http request may be compared with a score threshold, and when the score corresponding to the http request is greater than the score threshold, it is determined that the http request is offensive.

In some alternative implementations of the present embodiment, a white list may be pre-established, the white list includes a plurality of pieces of feature information, and each piece of feature information in the white list is feature information of a http request with a wrong detection result, i.e., a wrongly reported http request, pre-selected by an operation and maintenance engineer from a plurality of pre-detected offensive http requests. The feature information includes: a detected attack type, a name of a service requested by the http request, a URL (uniform resource locator) of the service requested by the http request, a detected attack field, an identifier of the attack rule template matching the http request, and a source IP address of the http request. The source IP address of the http request is an IP address of a device from which the http request is sourced, i.e., an IP address of a device sending the http request.

When the detection result of a http request is that the http request is offensive, whether the http request is offensive may be further verified using a white list. When the feature information of the http request matches at least one piece of feature information among all feature information in the white list, the detection result of the http request may be set to be non-offensive.

In some alternative implementations of the embodiment, in response to a http request being offensive in the detection result associated with a preset selection result, a score corresponding to the offensive http request is increased. The preset selection result is partial information selected from items of statistical information among pre-ranked items of statistical information. The statistical information includes: the number of http requests corresponding to each target attack rule template, the number of http requests corresponding to each target url, and the number of http requests corresponding to each target source ip address.

When a http request being offensive in the detection result is associated with a preset selection result, on the basis of the score corresponding to the offensive http request obtained by calculating, the score corresponding to the offensive http request may be increased.

An attack rule template matching at least one http request among a plurality of pre-detected offensive http requests may be referred to as a target rule template. A http request corresponding to a target attack rule template is a http request matching the target attack rule template among the plurality of offensive http requests. All target attack rule templates may be ranked by the number of corresponding http requests in descending order, and a preset number of top-ranked target attack rule templates are selected for use as a preset selection result.

A URL of a service requested by at least one http request among a plurality of pre-detected offensive http requests may be referred to as a target URL. A http request corresponding to a target URL is a http request requesting a service with a URL being the target URL among a plurality of pre-detected offensive http requests. All target URLs may be ranked by the number of corresponding http requests in descending order, and a preset number of top-ranked target URLs are selected for use as a preset selection result.

An IP address of a device from which a http request among a plurality of pre-detected offensive http requests is sourced may be referred to as a target source IP address. A http request corresponding to a target source IP address is a http request sourced from a device having the target source IP address among a plurality of pre-detected offensive http requests. All target source IP addresses may be ranked by the number of corresponding http requests in descending order, and a preset number of top-ranked target source IP addresses are selected for use as a preset selection result.

When a http request being offensive in the detection result is associated with a preset selection result, on the basis of the score corresponding to the http request obtained by calculating, the score corresponding to the offensive http request may be increased.

For example, when an attack rule template matching the http request being offensive in the detection result is a target attack rule template among top-ranked N target attack rule templates, the score corresponding to the http request being offensive in the detection result may be increased, and when a URL of a service requested by the http request being offensive in the detection result is a URL among a preset number of selected top-ranked target URLs, the score corresponding to the http request being offensive in the detection result may be increased. When an IP address of a device from which a http request being offensive in the detection result is a target source IP address among a preset number of top-ranked target source IP addresses, the score corresponding to the http request being offensive in the detection result may be increased.

In some alternative implementations of the present embodiment, for a http request being offensive in the detection result requiring replay attack, identity authentication information required to resend the offensive http request may be acquired from the web blog of the server of the service requested by the http request. The http request being offensive in the detection result requiring replay attack may be a http request being offensive in the detection result and succeeding in an attack. When requiring detailed analysis, operation and maintenance personnel may replay the http request, i.e., resend the http request to the server of the service requested by the offensive http request using the device, to retrigger an attack process. As corresponding operations of most services may be performed only after identity authentication is successful, the identity authentication information may be acquired from the web log on the server of the service requested by the http request. The identity authentication information may be sent to a device configured to resend the offensive hypertext transfer protocol request, such that the device resends the offensive http request to the server of the service requested by the offensive http request using the identity authentication information after identity authentication is successful, to retrigger the attack process. Information associated with the attack process may be detected in the server of the service requested by the offensive http request. The information associated with the attack process may include: a response state associated with the attack process, a response duration of the attack, and a response content in the attack process. Thus, the information associated with the attack process may be provided to the operation and maintenance engineer, such that the operation and maintenance engineer may perform analysis.

Figure 3:
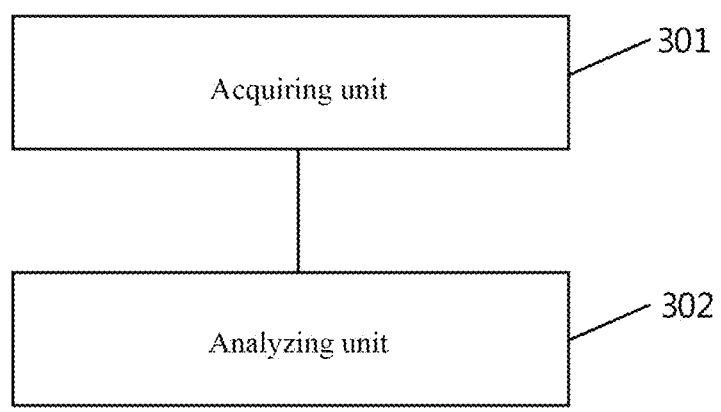
FIG. 3 shows a schematic structural diagram of an apparatus for analyzing a cyberattack according to an embodiment of the present disclosure.

Further referring to FIG. 3, as an implementation of the method shown in the above figures, an embodiment the present disclosure provides an apparatus for analyzing a cyberattack. The embodiment of the apparatus corresponds to the embodiment of the method shown in FIG. 2.

As shown in FIG. 3, the apparatus for analyzing a cyberattack of the present embodiment includes: an acquiring unit 301, and an analyzing unit 302. The acquiring unit 301 is configured to acquire a web blog of a server, the web blog of the server including: a hypertext transfer protocol request received by the server, and a data portion extracted from a response of hypertext transfer protocol corresponding to the hypertext transfer protocol request; and the analyzing unit 302 is configured to detect whether the hypertext transfer protocol request in the web log is offensive, to obtain a detection result of the hypertext transfer protocol request, and store the hypertext transfer protocol request, the detection result of the hypertext transfer protocol request, and the extracted data portion correspondingly.

In some alternative implementations of the present embodiment, the analyzing unit includes: an attack detecting subunit configured to calculate, in response to the hypertext transfer protocol request matching at least one attack rule template, a score corresponding to the hypertext transfer protocol request, the score corresponding to the hypertext transfer protocol request being a sum of a score corresponding to each attack rule template matching the hypertext transfer protocol request, the score corresponding to each attack rule template indicating a hazard level of an attack approach corresponding to the attack rule template on a system; and obtain the detection result of the hypertext transfer protocol request based on the score corresponding to the hypertext transfer protocol request.

In some alternative implementations of the present embodiment, the apparatus for analyzing a cyber attack further includes: a filtering unit configured to set, in response to feature information of a hypertext transfer protocol request being offensive in the detection result matching feature information of a preset white list, the detection result of the offensive hypertext transfer protocol request to be non-offensive, where each piece of the feature information in the white list is feature information of a hypertext transfer protocol request with a wrong detection result pre-selected from a plurality of detected offensive hypertext transfer protocol requests, and the feature information includes: a detected attack type, a name of a service requested by the hypertext transfer protocol request, a URL of the service requested by the hypertext transfer protocol request, a detected attack field, an identifier of an attack rule template matching the hypertext transfer protocol request, and a source IP address of the hypertext transfer protocol request.

In some alternative implementations of the present embodiment, the apparatus for analyzing a cyber attack further includes: an adjusting unit configured to increase, in response to the hypertext transfer protocol request being offensive in the detection result associated with a preset selection result, a score corresponding to the offensive hypertext transfer protocol request, the preset selection result being selected from items of statistical information among pre-ranked items of statistical information, the statistical information including: a number of hypertext transfer protocol requests corresponding to each target attack rule template, a number of hypertext transfer protocol requests corresponding to each target URL, and a number of hypertext transfer protocol requests corresponding to each target source IP address, where the target attack rule template is an attack rule template matching at least one of a plurality of pre-detected offensive hypertext transfer protocol requests, the target URL is a URL of a service requested by at least one of the plurality of offensive hypertext transfer protocol requests, and the target source IP address is an IP address of a device from which a hypertext transfer protocol request among the plurality of offensive hypertext transfer protocol request requests is sourced.

In some alternative implementations of the present embodiment, the apparatus for analyzing a cyber attack further includes: a replaying unit configured to acquire, for a hypertext transfer protocol request being offensive in the detection result requiring replay attack, identity authentication information required to resend the offensive hypertext transfer protocol request from the web blog of the server of the service requested by the hypertext transfer protocol request; send the identity authentication information to a device configured to resend the offensive hypertext transfer protocol request, to cause the device to resend the offensive hypertext transfer protocol request to the server using the identity authentication information after identity authentication is successful, to trigger an attack process on the server; and generate information associated with the attack process.

Figure 4:
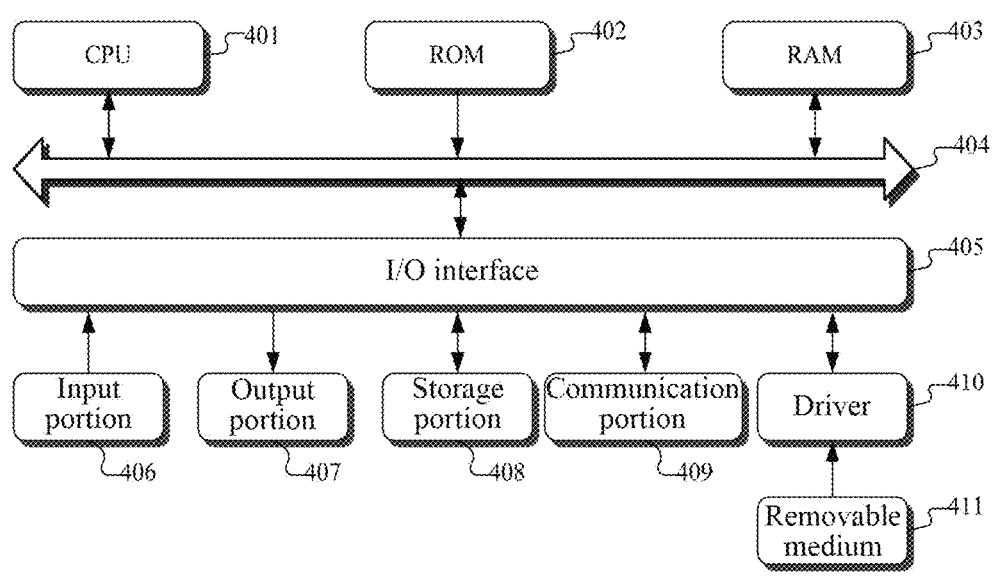
FIG. 4 is a schematic structural diagram of a computer system adapted to implement a server of embodiments of the present disclosure.

FIG. 4 shows a schematic structural diagram of a computer system adapted to implement a server of embodiments of the present disclosure.

As shown in FIG. 4, the computer system includes a central processing unit (CPU) 401, which may execute various appropriate actions and processes in accordance with a program stored in a read only memory (ROM) 402 or a program loaded into a random access memory (RAM) 403 from a storage portion 408. The RAM 403 further stores various programs and data required by operations of the computer system. The CPU 401, the ROM 402, and the RAM 403 are connected to each other through a bus 404. An input/output (I/O) interface 405 is also connected to the bus 404.

The following components are connected to the I/O interface 405: an input portion 406; an output portion 407; a storage portion 408 including a hard disk, or the like; and a communication portion 409 including a network interface card, such as a LAN card, and a modem. The communication portion 409 performs communication processes via a network, such as the Internet. A driver 410 is also connected to the I/O interface 405 as required. A removable medium 411, such as a magnetic disk, an optical disk, a magneto-optical disk, and a semiconductor memory, may be installed on the driver 410, so that a computer program read therefrom is installed on the storage portion 408 as needed.

In particular, the process described in the embodiment of the present disclosure may be implemented as a computer program. For example, an embodiment of the present disclosure includes a computer program product, which includes a computer program that is tangibly embedded in a computer readable medium. The computer program includes instructions for executing the method as illustrated in the flow chart. The computer program may be downloaded and installed from a network via the communication portion 409, and/or may be installed from the removable medium 411. The computer program, when executed by the central processing unit (CPU) 401, implements the above functions as defined by the method of the present disclosure.

The present disclosure further provides a server. The server may be provided with one or more processors; and a memory configured to store one or more programs, where the one or more programs may contain instructions for executing the operations described in the above embodiments. The one or more programs, when executed by the one or more processors, cause the one or more processors to execute the operations described in the above embodiments.

The present disclosure further provides a computer readable medium. The computer readable medium may be included in the server, or a stand-alone computer readable medium without being assembled into the server. The computer readable medium stores one or more programs. The one or more programs, when executed by the server, cause the server to execute operations described in the above embodiments.

It should be noted that the computer readable medium according to the present disclosure may be a computer readable signal medium or a computer readable storage medium or any combination of the above two. An example of the computer readable storage medium may include, but is not limited to: electric, magnetic, optical, electromagnetic, infrared, or semiconductor systems, apparatuses, or elements, or a combination of any of the above. A more specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the present disclosure, the computer readable storage medium may be any tangible medium containing or storing programs, which may be used by, or used in combination with, a message execution system, apparatus, or element. In the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a message execution system, apparatus, or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable messages for implementing specified logical functions. It should be further noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer messages.

The above description only provides explanation of the preferred embodiments of the present disclosure and the employed technical principles. It should be appreciated by those skilled in the art that the inventive scope of the present disclosure is not limited to the technical embodiments formed by the particular combinations of the above-described technical features. The inventive scope should also cover other technical embodiments formed by any combination of the above-described technical features or equivalent features thereof without departing from the concept of the disclosure, for example, technical embodiments formed by the above-described features being interchanged with, but not limited to, technical features with similar functions disclosed in the present disclosure.

What is claimed is:

1. A method for analyzing a cyber attack, comprising:
    acquiring a web log of a server, the web log of the server comprising: a hypertext transfer protocol request received by the server, and a data portion extracted from a response of hypertext transfer protocol corresponding to the hypertext transfer protocol request;
    detecting whether the hypertext transfer protocol request in the web log is offensive, to obtain a detection result of the hypertext transfer protocol request, and storing the hypertext transfer protocol request, the detection result of the hypertext transfer protocol request, and the extracted data portion correspondingly; and
    setting, in response to determining that feature information of the hypertext transfer protocol request being offensive in the detection result matches feature information of a preset white list, the detection result of the offensive hypertext transfer protocol request to be non-offensive, wherein each piece of the feature information in the preset white list is feature information of a non-offensive hypertext transfer protocol request pre-selected from a plurality of detected offensive hypertext transfer protocol requests,
    wherein the detecting whether the hypertext transfer protocol request in the web log is offensive, to obtain a detection result of the hypertext transfer protocol request comprises:
    calculating, in response to the hypertext transfer protocol request matching at least one attack rule template, a score corresponding to the hypertext transfer protocol request, the score corresponding to the hypertext transfer protocol request being a sum of a score corresponding to each attack rule template matching the hypertext transfer protocol request, the score corresponding to each attack rule template indicating a hazard level of an attack approach corresponding to the attack rule template on a system; and
    obtaining the detection result of the hypertext transfer protocol request based on the score corresponding to the hypertext transfer protocol request.

2. The method according to claim 1, wherein
the feature information comprises: a detected attack type, a name of a service requested by the hypertext transfer protocol request, a uniform resource locator (URL) of the service requested by the hypertext transfer protocol request, a detected attack field, an identifier of an attack rule template matching the hypertext transfer protocol request, and a source IP address of the hypertext transfer protocol request.

3. The method according to claim 2, wherein the method further comprises:
    increasing, in response to the hypertext transfer protocol request being offensive in the detection result associated with a preset selection result, a score corresponding to the offensive hypertext transfer protocol request, the preset selection result being selected from items of statistical information among pre-ranked items of statistical information, the statistical information comprising:
        a number of hypertext transfer protocol requests corresponding to each target attack rule template,
        a number of hypertext transfer protocol requests corresponding to each target URL, and
        a number of hypertext transfer protocol requests corresponding to each target source IP address,
    wherein the target attack rule template is an attack rule template matching at least one of a plurality of pre-detected offensive hypertext transfer protocol requests, the target URL is a URL of a service requested by at least one of the plurality of pre-detected offensive hypertext transfer protocol requests, and the target source IP address is an IP address of a device from which the hypertext transfer protocol request among the plurality of pre-detected offensive hypertext transfer protocol requests is sourced.

4. The method according to claim 3, wherein the method further comprises:
    acquiring, for a hypertext transfer protocol request being offensive in the detection result requiring replay attack, identity authentication information required to resend the offensive hypertext transfer protocol request from the web log of the server of the service requested by the hypertext transfer protocol request;
    sending the identity authentication information to a device configured to resend the offensive hypertext transfer protocol request, to cause the device to resend the offensive hypertext transfer protocol request to the server using the identity authentication information after identity authentication is successful, to trigger an attack process on the server; and
    generating information associated with the attack process.

5. The method according to claim 1, wherein the feature information comprises at least one of: a detected attack type, a name of a service requested by the hypertext transfer protocol request, a uniform resource locator (URL) of the service requested by the hypertext transfer protocol request, a detected attack field, an identifier of an attack rule template matching the hypertext transfer protocol request, or a source IP address of the hypertext transfer protocol request.

6. An apparatus for analyzing a cyber attack, comprising:
    at least one processor; and
    a memory storing instructions, wherein the instructions when executed by the at least one processor, cause the at least one processor to perform operations, the operations comprising:
    acquiring a web log of a server, the web log of the server comprising: a hypertext transfer protocol request received by the server, and a data portion extracted from a response of hypertext transfer protocol corresponding to the hypertext transfer protocol request;
    detecting whether the hypertext transfer protocol request in the web log is offensive, to obtain a detection result of the hypertext transfer protocol request, and storing the hypertext transfer protocol request, the detection result of the hypertext transfer protocol request, and the extracted data portion correspondingly; and
    setting, in response to determining that feature information of the hypertext transfer protocol request being offensive in the detection result matches feature information of a preset white list, the detection result of the offensive hypertext transfer protocol request to be non-offensive, wherein each piece of the feature information in the preset white list is feature information of a non-offensive hypertext transfer protocol request preselected from a plurality of detected offensive hypertext transfer protocol requests, wherein the detecting whether the hypertext transfer protocol request in the web log is offensive, to obtain a detection result of the hypertext transfer protocol request comprises:

calculating, in response to the hypertext transfer protocol request matching at least one attack rule template, a score corresponding to the hypertext transfer protocol request, the score corresponding to the hypertext transfer protocol request being a sum of a score corresponding to each attack rule template matching the hypertext transfer protocol request, the score corresponding to each attack rule template indicating a hazard level of an attack approach corresponding to the attack rule template on a system; and obtaining the detection result of the hypertext transfer protocol request based on the score corresponding to the hypertext transfer protocol request.

7. The apparatus according to claim 6, wherein the feature information comprises: a detected attack type, a name of a service requested by the hypertext transfer protocol request, a uniform resource locator (URL) of the service requested by the hypertext transfer protocol request, a detected attack field, an identifier of an attack rule template matching the hypertext transfer protocol request, and a source IP address of the hypertext transfer protocol request.

8. The apparatus according to claim 7, wherein the operations further comprise:

increasing, in response to the hypertext transfer protocol request being offensive in the detection result associated with a preset selection result, a score corresponding to the offensive hypertext transfer protocol request, the preset selection result being selected from items of statistical information among pre-ranked items of statistical information, the statistical information comprising:
   a number of hypertext transfer protocol requests corresponding to each target attack rule template,
   a number of hypertext transfer protocol requests corresponding to each target URL, and
   a number of hypertext transfer protocol requests corresponding to each target source IP address,
wherein the target attack rule template is an attack rule template matching at least one of a plurality of pre-detected offensive hypertext transfer protocol requests, the target URL is a URL of a service requested by at least one of the plurality of pre-detected offensive hypertext transfer protocol requests, and the target source IP address is an IP address of a device from which the hypertext transfer protocol request among the plurality of pre-detected offensive hypertext transfer protocol requests is sourced.

9. The apparatus according to claim 8, wherein the operations further comprise:

acquiring, for a hypertext transfer protocol request being offensive in the detection result requiring replay attack, identity authentication information required to resend the offensive hypertext transfer protocol request from the web log of the server of the service requested by the hypertext transfer protocol request;

sending the identity authentication information to a device configured to resend the offensive hypertext transfer protocol request, to cause the device to resend the offensive hypertext transfer protocol request to the server using the identity authentication information after identity authentication is successful, to trigger an attack process on the server; and generating information associated with the attack process.

10. A non-transitory computer readable medium, storing a computer program thereon, wherein the program, when executed by a processor, causes the processor to perform operations, the operations comprising:

acquiring a web log of a server, the web log of the server comprising: a hypertext transfer protocol request received by the server, and a data portion extracted from a response of hypertext transfer protocol corresponding to the hypertext transfer protocol request;

detecting whether the hypertext transfer protocol request in the web log is offensive, to obtain a detection result of the hypertext transfer protocol request, and storing the hypertext transfer protocol request, the detection result of the hypertext transfer protocol request, and the extracted data portion correspondingly; and setting, in response to determining that feature information of the hypertext transfer protocol request being offensive in the detection result matches feature information of a preset white list, the detection result of the offensive hypertext transfer protocol request to be non-offensive, wherein each piece of the feature information in the preset white list is feature information of a non-offensive hypertext transfer protocol request preselected from a plurality of detected offensive hypertext transfer protocol requests, wherein the detecting whether the hypertext transfer protocol request in the web log is offensive, to obtain a detection result of the hypertext transfer protocol request comprises:

calculating, in response to the hypertext transfer protocol request matching at least one attack rule template, a score corresponding to the hypertext transfer protocol request, the score corresponding to the hypertext transfer protocol request being a sum of a score corresponding to each attack rule template matching the hypertext transfer protocol request, the score corresponding to each attack rule template indicating a hazard level of an attack approach corresponding to the attack rule template on a system; and obtaining the detection result of the hypertext transfer protocol request based on the score corresponding to the hypertext transfer protocol request.

11. The non-transitory computer readable medium according to claim 10, wherein
the feature information comprises: a detected attack type, a name of a service requested by the hypertext transfer protocol request, a uniform resource locator (URL) of the service requested by the hypertext transfer protocol request, a detected attack field, an identifier of an attack rule template matching the hypertext transfer protocol request, and a source IP address of the hypertext transfer protocol request.

12. The non-transitory computer readable medium according to claim 11, wherein the operations further comprise:

increasing, in response to the hypertext transfer protocol request being offensive in the detection result associated with a preset selection result, a score corresponding to the offensive hypertext transfer protocol request, the preset selection result being selected from items of statistical information among pre-ranked items of statistical information, the statistical information comprising:
- a number of hypertext transfer protocol requests corresponding to each target attack rule template,
- a number of hypertext transfer protocol requests corresponding to each target URL, and
- a number of hypertext transfer protocol requests corresponding to each target source IP address, wherein the target attack rule template is an attack rule template matching at least one of a plurality of pre-detected offensive hypertext transfer protocol requests, the target URL is a URL of a service requested by at least one of the plurality of pre-detected offensive hypertext transfer protocol requests, and the target source IP address is an IP address of a device from which the hypertext transfer protocol request among the plurality of pre-detected offensive hypertext transfer protocol requests is sourced.

13. The non-transitory computer readable medium according to claim 12, wherein the operations further comprise:
- acquiring, for a hypertext transfer protocol request being offensive in the detection result requiring replay attack, identity authentication information required to resend the offensive hypertext transfer protocol request from the web log of the server of the service requested by the hypertext transfer protocol request;
- sending the identity authentication information to a device configured to resend the offensive hypertext transfer protocol request, to cause the device to resend the offensive hypertext transfer protocol request to the server using the identity authentication information after identity authentication is successful, to trigger an attack process on the server; and
- generating information associated with the attack process.

* * * * *

UNITED STATES PATENT AND TRADEMARK OFFICE
CERTIFICATE OF CORRECTION

| | |
|---|---|
| PATENT NO. | : 11,233,819 B2 |
| APPLICATION NO. | : 16/562161 |
| DATED | : January 25, 2022 |
| INVENTOR(S) | : Jinjin Li |

It is certified that error appears in the above-identified patent and that said Letters Patent is hereby corrected as shown below:

In the Claims

In Column 12, Line 7, in Claim 10, before "program," insert -- computer --.

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*